PROCESS FOR THE PRODUCTION OF LEVANE SUCRASE

Wilfried Kaufmann and Klaus Bauer, Wuppertal-Elberfeld, Germany, assignors, by mesne assignments, to Farbenfabriken Bayer Aktiengesellschaft, a corporation of Germany
No Drawing. Filed Apr. 30, 1958, Ser. No. 731,876
Claims priority, application Germany May 2, 1957
5 Claims. (Cl. 195—66)

This invention relates to a process for the production of levane sucrase and it has particular relation to a process of this type in which levane sucrase is produced in cultures of *Bacillus subtilis*.

It has been known that *Bacillus subtilis*, and some other bacteria, form levane in the presence of sucrose and some tests have been described in literature for carrying out a purely fermentative synthesis of levane by means of the levane-forming ferment, or enzyme i.e. the levane sucrase. (See Nature, 149, 527 (1942), and Appl. Microbiology, 3, 321 (1955).)

Under the hitherto suggested conditions levane sucrase is formed in low concentrations only and nothing has become known about its preparation in pure condition and its chemical structure. The levane sucrase played no role up to date, in the manufacture of commercial charges of levane, which could be used for various pharmaceutical purposes.

A main object of the present invention is to provide a new process for producing solutions of the enzyme levane sucrase which is capable of forming under suitable conditions levane of high-molecular weight. In this process, the levane sucrase is formed in cultures of *Bacillus subtilis*.

It has been found that solutions of relatively very high concentrations of levane sucrase can be produced on a commercial scale if a series of the specific conditions described hereinafter are observed. It has been found that in the recovery of maximum amounts of levane sucrase from the cells of *Bac. subtilis* according to the present invention a combination of the following conditions is of decisive importance:

(1) The presence or addition of ammonium salts in amounts higher than those necessary for maximum growth of the organisms;

(2) The presence or addition of phosphate ions in amounts necessary for optimum growth of the organisms, whereby, however, no excess of the phosphate should be used.

(3) Sucrose concentrations of 2–15%, preferably 10%;

(4) Intensive aeration at fermentation temperatures of about 30° C.;

(5) Fermentation at a pH of 6.0–7.0 for a period of 7 to 15 hours;

(6) Removal of precipitates from the sterilized technical nutritive solutions.

In carrying out the process of the present invention as a complex nutrient medium a 2% corn steep liquor solution is used from which the substances precipitable in the heat at a pH of 7.0 have been removed.

It has been found that at constancy of the sucrose concentration and of the other fermentation conditions, introduction of $(NH_4)^+$ in addition to the organic and inorganic nitrogen sources present in the base nutrient solution, result in a considerably higher content of levane sucrase in the culture, while simultaneous, increasing additions of $PO_4^{---}$ cause a strong decrease of the levane sucrase content.

It has been unexpectedly found that the main recovery of levane sucrase starts between the logarithmic and the stationary phase of growth of the *Bac. subtilis* cultures, but stops immediately as soon as the sucrose is consumed by the action of the levane sucrase present in the culture medium.

Particularly high yields of levane sucrase are obtained with very intensive aeration and at a temperature of about 30° C. It is remarkable that in cultures having higher temperatures less enzyme is produced, in spite of faster propagation of the cells.

It is of essential importance that fermentation be carried out at a pH of 6.0–7.0, whereby the acid formed is neutralized by $CaCO_3$, and if necessary by additional admixtures of concentrated $Na_2CO_3$ solution.

Levane sucrase is extremely easily bound by absorption, whereby certain characteristics of the ferment are changed. As the organic and inorganic substances which are precipitable at neutral reaction in the heat from solutions of the corn steep liquor, have a very strong adsorptive effect on levane sucrase, it is necessary to remove such substances prior to the inoculation of the nutrient solutions. It has been also found that the microbial decomposition of certain ingredients of these solid substances present in the heated corn steep liquor, strongly inhibits the formation of levane sucrase in the culture.

The method used for determination of the relative concentration of levane sucrase proved to be adequate for the requirements of technical and operating control, in spite of relatively considerable limits of error. As a relative measure for the resulting levane concentrations, the reducing sugar which is formed in the bio-synthesis of the polysaccharide and was quantitatively determined as glucose, was used. However, as the reaction

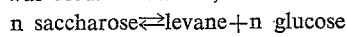
n saccharose⇌levane+n glucose does not take place quantitatively and results in an equilibrium, several dilutions were prepared from each culture solution and admixed with an equal amount of sucrose (25%) in each case. The samples were mixed with toluene, kept at 30° C. for 17 hours and then heated for a short time to 100° C. in order to inactivate the enzyme. For the determination of the levane sucrase concentration only those dilutions of the culture solutions were used, which contained, after the end of the before-mentioned reaction period, 1.0–5.0% reducing sugar, referred to glucose. The "glucose concentration" determined according to conventional methods was multiplied with the diluting factor and thus indicated the relative concentration of levane sucrase.

Example 1

A 2% aqueous solution of corn steep liquor is adjusted with KOH to a pH of 7.0, heated to 120° C. for 20 minutes and filtered after cooling. After the addition of 10% sucrose, the solution is subjected to sterilization at 110° C. for 40 minutes and introduced with a volume of 7.5 liters into a laboratory fermenting vessel. This nutrient solution is denoted herein as the base nutrient solution. The fermenter is now inoculated with 150 ccm. of a 15–18 hours shaking culture of a levane-forming strain of *Bac. subtilis* which was cultivated in a base nutrient solution free from sucrose at 30° C. To this culture medium a sterile suspension of 75 grams of calcium carbonate in 150 ccm. of water is now added. The fermentation medium is aerated with 4 liters of air per minute at 400 revolutions of the stirring mechanism per minute. The temperature amounts to 30° C. A few hours, e.g. 4 hours, after inoculation the pH value changes to the acid range. From then on the pH value of the culture medium is kept by frequent additions of concentrated aqueous solutions of $Na_2CO_3$ in the range of 6.2–6.8. After cultivation for 12 hours, the relative concentration of levane sucrase in the fermentation medium amounts to 14.4.

Example 2

The conditions in this example are the same as in the above Example 1. However, to the base nutrient solution of the fermenting vessel 0.03% of $(NH_4)_2SO_4$ are added. After cultivation for 12 hours, the relative concentration of levane sucrase in the fermentation medium amounts to 26.2.

Example 3

The conditions in this example are the same as in Example 1. However, to the base nutrient solution in the fermenting vessel 0.15% of $(NH_4)_2SO_4$ are added. After cultivation for 12 hours, the relative concentration of levane sucrase in the fermentation medium amounts to 37.7.

Example 4

The conditions in this example are the same as in the above Example 1. However, to the base nutrient solution in the fermenting vessel 0.3% of $(NH_4)_2SO_4$ are added. After cultivation for 12 hours the relative concentration of levane sucrase in the fermentation medium amounts to 45.0.

Example 5

The conditions in this example are the same as in the above Example 1. However, to the base nutrient solution in the fermenting vessel 0.15% of $(NH_4)_2SO_4$ and 0.15% of $K_2HPO_4$ are added. After cultivation for 12 hours, the relative concentration of levane sucrase in the fermentation medium amounts to 20.0.

Example 6

The conditions in this example are the same as in the above Example 1. However, to the base nutrient solution in the fermenting vessel 0.15% of $(NH_4)_2SO_4$ and 0.05% of $K_2HPO_4$ are added. After cultivation for 12 hours, the relative concentration of levane sucrase in the fermentation medium amounts to 27.0.

Example 7

The conditions in this example are the same as in the above Example 1. However, to the base nutrient solution in the fermenting vessel 0.15% of $K_2HPO_4$ and added. After cultivation for 12 hours, the relative concentration of levane sucrase in the fermentation medium amounts to 10.2.

Example 8

The conditions in this example are the same as in the above Example 3. However, aeration is carried out with two liters of air per minute, at a number of revolutions of 150 per minute of the stirring mechanism. After cultivation for 12 hours, the relative concentration of levane sucrase in the fermentation medium amounts to 25.0.

Example 9

A 2% solution of corn steep liquor is adjusted with KOH to a pH of 7.0 and heated to 120° C. for 20 minutes. After cooling, to the non-filtered nutrient solution 10% of sucrose and 0.15% of $(NH_4)_2SO_4$ are added. The nutrient solution is then sterilized at 110° C. for 40 minutes and introduced with a volume of 7.5 liters into a laboratory fermenting vessel. The other conditions are the same as in the above Example 1. After cultivation for 12 hours, the relative concentration in the fermentation medium amounts to 8.3.

"The intensive aeration" mentioned above can be carried out in conventional manner, e.g. by introducing into the fermentation liquid air under moderate pressure and dividing the air bubbles by a quickly revolving stirrer, whereby a fine distribution of the air is obtained. The term "between the logarithmic and the stationary phase of growth" refers to the phase of growth, in which turbidity measurements indicate that the maximum growth is nearly reached. In order to determine the value of the above mentioned "relative concentration" of the levane sucrase, the amount of reducing sugar, referred to glucose, is determined in the diluted samples, using for example the analytical method known under the name Fehling's titration method, and the calculated percent amount of glucose is multiplied with the diluting factor of the respective sample, in order to obtain the desired "relative concentration."

It will be understood from the above that this invention is not limited to the specific nutrient solutions, concentrations, temperatures, nutrient ingredients and other conditions specifically described above and can be carried out with various modifications. Thus, instead of $(H_4N)_2SO_4$ other ammonium salts, such as ammonium chloride, ammonium carbonate, ammonium lactate or ammonium acetate can be used and the presence of phosphate ions in the form of other phosphate salts, such as $Na_2HPO_4$, $NaH_2PO_4$, $Na_3PO_4$, $KH_2PO_4$, $K_3PO_4$, $$(NH_4)_2HPO_4$$

etc. should be also avoided. The amount of ammonium salts should be in the range of 0.03–2.0% of $(H_4N)_2SO_4$, or equivalent amounts of other ammonium salts. These and other modifications can be made without departing from the scope of the invention, as defined in the appended claims.

The percent and parts described above are by weight, if not otherwise stated.

What is claimed is:

1. A process for the production of levane sucrase, comprising adding to cultures of *Bacillus subtilis*, in addition to complex nutrient ingredients of the cultures, $(NH_4)^+$ ions, in concentrations corresponding to 0.03–2.0% ammonium sulfate, and sucrose in concentrations within the range of 2–15%; and limiting the amount of $PO_4^{---}$ ions in the fermentation medium to the amount in 2% corn steep liquor; and subjecting the cultures to fermentation with intensive aeration and maintaining a pH of 6.0–7.0 throughout the fermentation.

2. A process as claimed in claim 1, in which fermentation is carried out at about 30° C.

3. A process as claimed in claim 1, in which fermentation is continued for 7–15 hours.

4. A process as claimed in claim 1, in which sucrose is added in a concentration of about 10%.

5. A process as claimed in claim 1, in which a solution of corn steep liquor, separated by filtration from substances precipitable at neutral condition in the heat, is used as culture medium.

References Cited in the file of this patent

UNITED STATES PATENTS

| | | |
|---|---|---|
| 2,203,703 | Stahly | June 11, 1940 |
| 2,686,778 | Wimmer | Aug. 17, 1954 |

OTHER REFERENCES

Doudoroff et al.: Journal of Biological Chemistry, 1945, vol. 159, pages 585 to 592.

Applied Microbiology, vol. 3, pages 321–330 (1955).

Journal of General Microbiology, vol. 15, No. 3, pages 462 to 469 (1956).